US012195318B1

(12) United States Patent
Lee et al.

(10) Patent No.: US 12,195,318 B1
(45) Date of Patent: Jan. 14, 2025

(54) FLUID MATERIAL DISPENSING APPARATUS CAPABLE OF MAINTAINING FLUID MATERIAL WITHIN MATERIAL TRANSMISSION PATH AT LOW TEMPERATURE

(71) Applicant: Botrista, Inc., Dover, DE (US)

(72) Inventors: Yu-Min Lee, Taipei (TW); Wu-Chou Kuo, Taipei (TW)

(73) Assignee: Botrista, Inc., Dover, DE (US)

( * ) Notice: Subject to any disclaimer, the term of this patent is extended or adjusted under 35 U.S.C. 154(b) by 0 days.

(21) Appl. No.: 18/824,441

(22) Filed: Sep. 4, 2024

Related U.S. Application Data

(62) Division of application No. 18/103,908, filed on Jan. 31, 2023, now Pat. No. 12,129,161.

(Continued)

(51) Int. Cl.

*B67D 1/00* (2006.01)
*B67D 1/08* (2006.01)
*B67D 1/10* (2006.01)

(52) U.S. Cl.

CPC ......... *B67D 1/0021* (2013.01); *B67D 1/0857* (2013.01); *B67D 1/10* (2013.01);

(Continued)

(58) Field of Classification Search

CPC ...... B67D 1/0021; B67D 1/0857; B67D 1/10; B67D 2001/0097; B67D 2210/00104;

(Continued)

(56) References Cited

U.S. PATENT DOCUMENTS 2,257,070 A * 9/1941 Perlick ..................... B67D 1/06 222/131
2,721,450 A * 10/1955 Entler .................. B67D 1/0857 62/304

(Continued)

FOREIGN PATENT DOCUMENTS

CN 211155218 U 8/2020
TW M605878 U 12/2020

OTHER PUBLICATIONS

Taiwanese Notice of Allowance for Taiwanese Application No. 112103373, dated Jan. 17, 2024, with an English translation.

(Continued)

*Primary Examiner* — Donnell A Long

(74) *Attorney, Agent, or Firm* — Birch, Stewart, Kolasch & Birch, LLP

(57) ABSTRACT

A fluid material dispensing apparatus includes: a material outlet chamber; an upper chamber, arranged to operably connect to the material outlet chamber; a target air extraction device, positioned on a side wall of the material outlet chamber and arranged to operably extract a part of cold air in the material outlet chamber into the upper chamber; multiple pumps arranged to respectively extract multiple fluid materials stored in multiple material containers, and to operably push corresponding fluid materials forward; and a fluid output device positioned on a bottom of the material outlet chamber and comprising multiple fluid outlets, wherein the multiple fluid outlets are respectively coupled with the multiple pumps through multiple material transmission paths, and are respectively arranged to dispense corresponding fluid materials to a target container.

18 Claims, 4 Drawing Sheets

Related U.S. Application Data

(60) Provisional application No. 63/304,878, filed on Jan. 31, 2022.

(52) U.S. Cl.
CPC ................ *B67D 2001/0097* (2013.01); *B67D 2210/00104* (2013.01)

(58) Field of Classification Search
CPC .... B67D 1/122; B67D 1/1234; B67D 1/0868; A47J 31/4403; A47J 31/46; A47J 31/468; A47J 31/505
See application file for complete search history.

(56) References Cited

U.S. PATENT DOCUMENTS

| | | | | |
|---|---|---|---|---|
| 2,909,044 | A * | 10/1959 | Wilcox ................ | B67D 1/0868 62/419 |
| 4,512,377 | A * | 4/1985 | Greer ................... | B67D 1/0857 222/129 |
| 4,610,145 | A * | 9/1986 | Arzberger ............ | B67D 1/1247 62/127 |
| 4,970,871 | A * | 11/1990 | Rudick ................. | F25D 17/065 62/448 |
| 7,762,431 | B1 | 7/2010 | Tuyls et al. | |
| 2004/0011828 | A1 * | 1/2004 | Van Der Klaauw ......................... | B67D 1/0412 222/527 |
| 2009/0236361 | A1 | 9/2009 | Doelman et al. | |
| 2011/0061420 | A1 | 3/2011 | Anderson et al. | |
| 2011/0114680 | A1 * | 5/2011 | Haskayne ............ | B67D 1/0857 222/400.7 |
| 2016/0107876 | A1 * | 4/2016 | Mackey .................... | F28D 1/06 62/331 |
| 2017/0152132 | A1 * | 6/2017 | Laible .................. | B67D 1/0888 |
| 2018/0332997 | A1 | 11/2018 | Kang et al. | |

OTHER PUBLICATIONS

Taiwanese Notice of Allowance for Taiwanese Application No. 112148805, dated Apr. 11, 2024, with an English translation.

Taiwanese Notice of Allowance for Taiwanese Application No. 112148806, dated Apr. 11, 2024, with an English translation.

Taiwanese Office Action and Search Report for Taiwanese Application No. 112103373, dated Nov. 27, 2023, with an English translation.

Taiwanese Office Action and Search Report for Taiwanese Application No. 112148800, dated Feb. 19, 2024, with an English translation.

Taiwanese Office Action and Search Report for Taiwanese Application No. 112148805, dated Feb. 19, 2024, with an English translation.

Taiwanese Office Action and Search Report for Taiwanese Application No. 112148806, dated Feb. 19, 2024, with an English translation.

* cited by examiner

FLUID MATERIAL DISPENSING APPARATUS CAPABLE OF MAINTAINING FLUID MATERIAL WITHIN MATERIAL TRANSMISSION PATH AT LOW TEMPERATURE

CROSS-REFERENCE TO RELATED APPLICATIONS

This application is a Divisional of co-pending U.S. patent application Ser. No. 18/103,908, filed on Jan. 31, 2023, which claims the benefit of priority to U.S. Provisional Application Ser. No. 63/304,878, filed on Jan. 31, 2022; the entirety of which is incorporated herein by reference for all purposes.

BACKGROUND

The disclosure generally relates to a fluid material dispensing apparatus and, more particularly, to a fluid material dispensing apparatus capable of maintaining fluid material within transmission path at low temperature.

As labor costs continue to rise and are impacted by factors (for example, pandemic disruptions or inflation leading to increased operating expenses), many operators have begun to utilize dispensing machines to assist in the preparation of freshly made beverages, in order to reduce the required labor time and costs.

It is well known that many ingredients used in freshly made beverages can deteriorate or breed bacteria when kept at room temperature for a certain period of time, especially those containing protein components (such as various ingredients containing milk or whey). Therefore, if conventional dispensing machines are used to dispense ingredients containing protein components, additional heating devices need to be installed inside the machines to continuously heat the relevant ingredients, so as to maintain them at high temperatures and reduce the possibility of bacterial growth.

However, if conventional dispensing machines do not have heating devices or are not suitable for installing heating devices, it is not possible to use the method of heating ingredients to suppress bacterial growth. Moreover, if ingredients containing protein components are kept at high temperatures for too long, they can also deteriorate, affecting taste and shortening the storage period of the ingredients.

SUMMARY

An example embodiment of a fluid material dispensing apparatus is disclosed, comprising: a material outlet chamber; an upper chamber, arranged to operably connect to the material outlet chamber; a target air extraction device, positioned on a side wall of the material outlet chamber and arranged to operably extract a part of cold air in the material outlet chamber into the upper chamber; multiple pumps, arranged to respectively extract multiple fluid materials stored in multiple material containers, and to operably push corresponding fluid materials forward; and a fluid output device, positioned on a bottom portion of the material outlet chamber, and comprising multiple fluid outlets, wherein the multiple fluid outlets are respectively coupled with the multiple pumps through multiple material transmission paths, and are respectively arranged to dispense corresponding fluid materials to a target container.

Another example embodiment of a fluid material dispensing apparatus is disclosed, comprising: a material outlet chamber, wherein a side wall of the material outlet chamber is provided with a target air extraction device, a pipe insertion port, and a reflow port; an upper chamber, arranged to operably connect to the material outlet chamber; multiple pumps, arranged to respectively extract multiple fluid materials stored in multiple material containers, and to operably push corresponding fluid materials forward; a fluid output device, positioned on a bottom portion of the material outlet chamber, and comprising multiple fluid outlets, wherein the multiple fluid outlets are respectively coupled with the multiple pumps through multiple material transmission paths, and are respectively arranged to dispense corresponding fluid materials to a target container; a temperature sensor, positioned in the material outlet chamber, arranged to operably sense an internal temperature of the material outlet chamber; a cold air tunnel, arranged to operably introduce cold air into the material outlet chamber, so as to maintain the internal temperature of the material outlet chamber below a predetermined temperature; and multiple air extraction devices, positioned on an airflow transmission path of the cold air tunnel, arranged to operably push cold air in the cold air tunnel forward; wherein multiple material transmission pipes coupled between the multiple pumps and the fluid output device pass through the pipe insertion port and enter the material outlet chamber; wherein cold air in the material outlet chamber flows into a main body of the fluid material dispensing apparatus through the reflow port; wherein the target air extraction device is arranged to operably extract a part of cold air in the material outlet chamber into the upper chamber.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
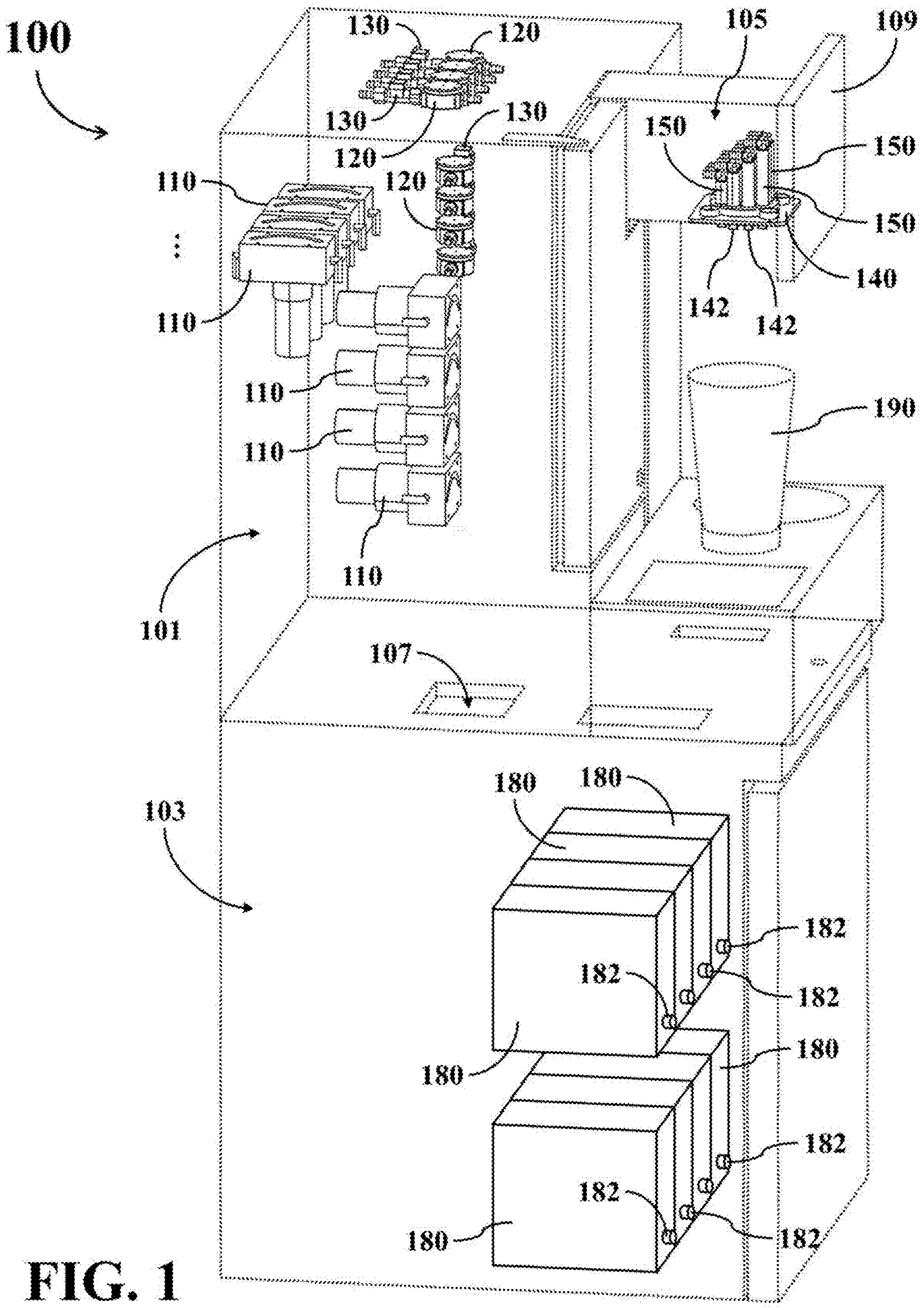
FIG. 1 and FIG. 2 collectively show a simplified schematic perspective diagram of a fluid material dispensing apparatus according to one embodiment of the present disclosure.
Figure 2:
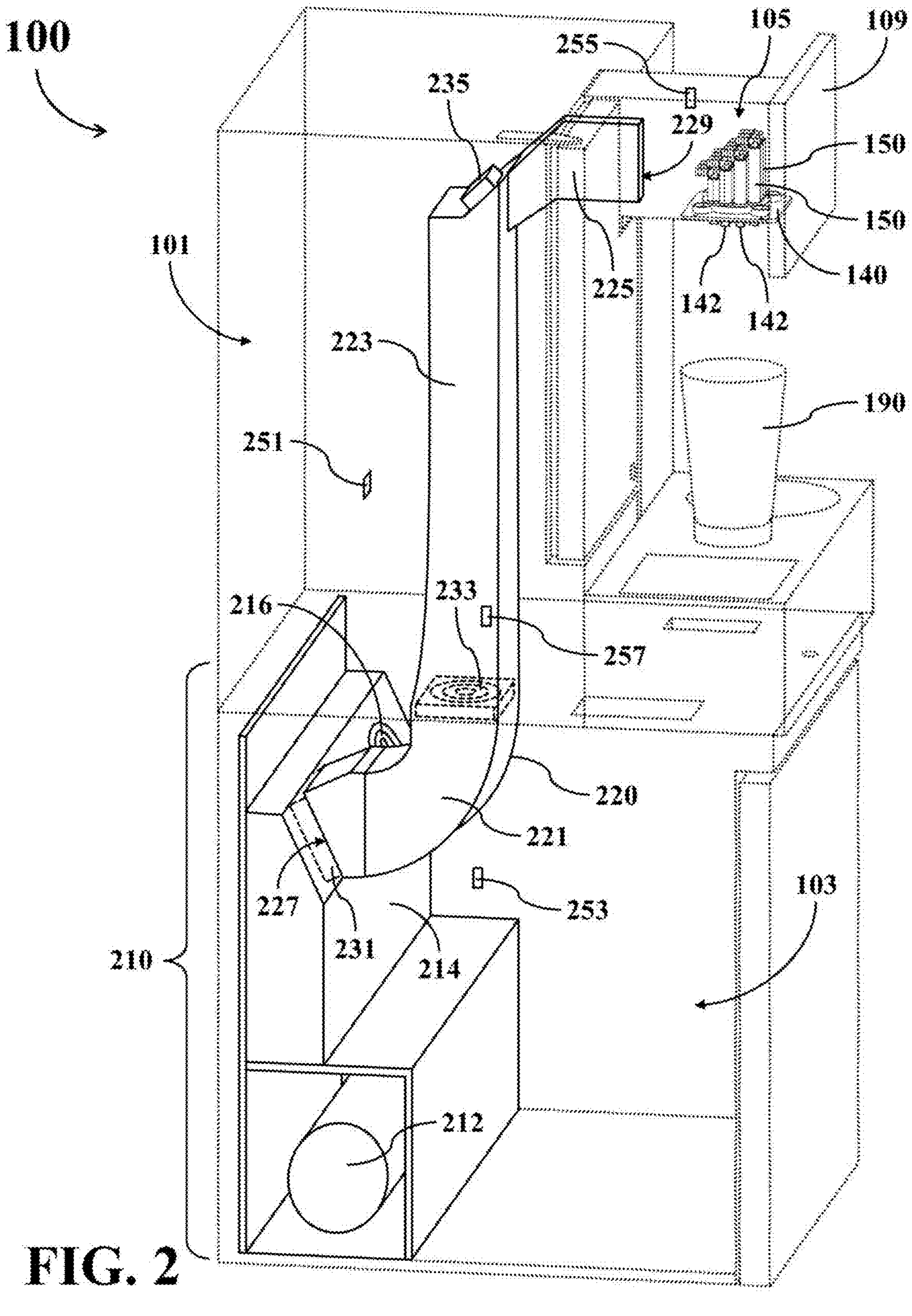

Please refer to FIG. 1 and FIG. 2, which collectively show a simplified schematic perspective diagram of a fluid material dispensing apparatus 100 according to one embodiment of the present disclosure. The fluid material dispensing apparatus 100 may automatically dispense various types of fluid materials, such as various sauces or various materials needed for preparing freshly made beverages, to a target container 190 according to the user's selection. In other words, the fluid material dispensing apparatus 100 may be utilized to serve as an automated beverage preparation apparatus, and may be utilized to serve as a sauce dispensing apparatus.

As shown in FIG. 1, the fluid material dispensing apparatus 100 comprises an upper chamber 101, a lower chamber 103, a material outlet chamber 105, one or more connecting channels 107, and a user control interface 109. In this embodiment, the fluid material dispensing apparatus 100 has a main body, and a neck portion extending outward from the main body. The upper chamber 101 and the lower chamber 103 are respectively located in the upper portion and the lower portion of the fluid material dispensing apparatus 100, and the material outlet chamber 105 is located in the neck portion of the fluid material dispensing apparatus 100. The user control interface 109 is coupled with the neck portion of the fluid material dispensing apparatus 100, and arranged to operably display related menu screens and operating screens for the user to choose from and manipulate.

In order to reduce the complexity of the drawing contents, only some components of the fluid material dispensing apparatus 100 which have different functions are respectively shown in FIG. 1 and FIG. 2. Additionally, the outline of the fluid material dispensing apparatus 100 is deliberately represented by broken lines in FIG. 1 and FIG. 2, while some internal components to be further described in the following are depicted with solid lines. Please note that the appearance shape of the fluid material dispensing apparatus 100 illustrated in FIG. 1 and FIG. 2 is merely a simplified exemplary embodiment for the purpose of explanatory convenience, rather than a restriction to the actual appearance of the fluid material dispensing apparatus 100.

The upper chamber 101 of the fluid material dispensing apparatus 100 may be connected to the material outlet chamber 105, and may be connected to the lower chamber 103 through the connecting channel 107. Relevant controlling circuits, electrical wires, signal lines, connectors, and/or material transmission pipes may be arranged inside the fluid material dispensing apparatus 100 in a variety of appropriate ways.

In this embodiment, the lower chamber 103 of the fluid material dispensing apparatus 100 may be utilized to place multiple material containers 180. Different material containers 180 are utilized for respectively storing different fluid materials. For example, the aforementioned fluid materials may be common beverage base materials such as water, sparkling water, black tea, green tea, soy milks, milk, milk-based liquids, coffee, nut pulps, various fruit-based concentrates, various vegetable-based concentrates, or the like.

For another example, the aforementioned fluid materials may be various syrups, such as agave syrup, dulce de leche, fructose, golden syrup, lemonade syrups, maltose syrup, maple syrup, molasses, orgeat, and/or palm syrup, or the like.

For yet another example, the aforementioned fluid materials may be various alcoholic beverages, such as beer, cocktails, and/or sake, or the like For yet another example, the aforementioned fluid materials may be various sauces or fluid condiments, such as apple sauce, chutneys, cranberry sauce, salad dressings, fruit coulis, ketchup, tomato sauce, mayonnaise, meat gravies, miso sauce, hummus, pasta sauce, piccalilli, soya sauce, spices sauce, spicy sauce, and/or ginger jam, or the like.

For yet another example, the aforementioned fluid materials may be various fluid materials, such as fruit juices containing fruit fibers, tea liquids with small particles (e.g., pearl or tapioca balls), honey, cooking oils, vinegar, jams, marmalade, pressed fruit paste, beer vinegar, buttercream, condensed milk, and/or cream, or the like.

As can be appreciated from the foregoing descriptions, the fluid material that the fluid material dispensing apparatus 100 can dispense may be fluid having higher density and viscosity than that of water, or may be fluid having lower viscosity than that of water.

Each material container 180 has an outlet connector 182, which may be connected to a corresponding component through various appropriate material transmission paths. In some embodiments, all of or some of the material containers 180 may be placed within the upper chamber 101 and/or the material outlet chamber 105. Alternatively, all of or some of the material containers 180 may be placed outside the fluid material dispensing apparatus 100.

In the embodiment of FIG. 1, the fluid material dispensing apparatus 100 further comprises multiple pumps 110, multiple damper devices 120, multiple flowmeters 130, a fluid output device 140, and multiple material output tubes 150.

The aforementioned multiple pumps 110 may be respectively connected to the aforementioned multiple material containers 180 and other components through various appropriate material transmission paths, and may be installed within the upper chamber 101, the lower chamber 103, and/or the material outlet chamber 105 in a variety of appropriate spatial arrangements.

An input terminal of each pump 110 may be coupled with the outlet connector 182 of a corresponding material container 180 through appropriate material transmission paths, and arranged to operably receive the fluid material transmitted from the corresponding material container 180. Each of the pumps 110 is arranged to operably apply pressure to the received fluid material so as to push the fluid material forward. In practice, each of the pumps 110 may be realized with various suitable liquid pump devices capable of pushing fluid forward, such as a peristaltic pump, a diaphragm pump, a rotary diaphragm pump, or the like.

Each of the aforementioned multiple damper devices 120 and multiple flowmeters 130 may be respectively connected to the aforementioned multiple pumps 110 or other components through various appropriate material transmission paths, and may be installed within the upper chamber 101, the lower chamber 103, and/or the material outlet chamber 105 in a variety of appropriate spatial arrangements.

Each damper device 120 may be coupled with an input terminal of a corresponding pump 110 or an output terminal of a corresponding pump 110 through various appropriate material transmission paths, and utilized for conducting a buffering operation on the fluid material flowing through the damper device 120.

Each flowmeter 130 may be coupled with an input terminal of a corresponding pump 110 or an output terminal of a corresponding pump 110 through various appropriate material transmission paths, or may be coupled with an input terminal of a corresponding damper device 120 or an output terminal of a corresponding damper device 120 through various appropriate material transmission paths, and utilized for measuring the material output volume of a corresponding fluid material.

Since the damper device 120 conducts a buffering operation on the fluid material flowing through the damper device 120, both the flow speed variation and the liquid pressure variation of the fluid material outputted by the damper device 120 will be apparently lower than the flow speed variation and the liquid pressure variation of the fluid material received by the input terminal of the damper device 120. Such structure is beneficial for improving the measuring accuracy of the flowmeter 130 in measuring the material output volume of a corresponding fluid material, thereby effectively increasing the material output volume control accuracy of the fluid material dispensing apparatus 100 for fluid materials.

The fluid output device 140 may be detachably arranged on a bottom portion of the material outlet chamber 105 through various appropriate connections, and the fluid output device 140 has multiple fluid outlets 142 which are respectively utilized for dispensing corresponding fluid materials to the target container 190. Each of the aforementioned multiple fluid outlets 142 may be arranged on the fluid output device 140 in a variety of appropriate ways, and respectively coupled with the aforementioned multiple pumps 110 through multiple material transmission paths. The output terminal of respective fluid outlets 142 may be exposed outside the material outlet chamber 105 to facilitate the user to carry out relevant cleaning procedures.

In practice, each of the aforementioned material transmission paths may be a single transmission pipe, or may be a combination of various transmission pipes and various connectors. For example, an individual fluid outlet 142 may be coupled with a corresponding pump 110 through a corresponding material output tube 150 and other transmission pipes, connectors, or other components.

In operations, the multiple pumps 110 in the fluid material dispensing apparatus 100 may respectively be utilized for extracting multiple fluid materials stored in the multiple material containers 180, and for pushing corresponding fluid materials to move forward, so as to cause the fluid output device 140 to dispense corresponding fluid materials to the target container 190.

In the fluid material dispensing apparatus 100, a pump 110, a damper device 120, a flowmeter 130, a material output tube 150, and a fluid outlet 142 may be connected by appropriate material transmission paths to form a material dispensing device. In this embodiment, the fluid material dispensing apparatus 100 comprises a plurality of material dispensing devices, which are respectively responsible for delivering the fluid materials stored in different material containers 180 to the corresponding fluid outlet 142.

In order to reduce the complexity of the drawing contents, other structures and devices within the fluid material dispensing apparatus 100 are not shown in FIG. 1 and FIG. 2, such as the internal control circuit, electrical wires, signal lines, power supply apparatus, some material transmission pipes, some detergent transmission pipes, and relevant components and frames for supporting or securing the above components.

In the embodiment where the fluid material dispensing apparatus 100 is utilized to serve as an automated beverage preparation apparatus (e.g., a cold beverage preparation apparatus), a user may place a target container 190 on a predetermined position (e.g., a position beneath the aforementioned multiple fluid outlets 142) and manipulate the user control interface 109 to configure one or more production parameters for the required freshly made beverages, such as beverage item, cup size, beverage volume, sugar level, ice level, and/or quantity of cups, or the like.

Then, the fluid material dispensing apparatus 100 would operate based on the parameters configured by the user to automatically utilize one or more pumps 110 to extract the fluid materials from one or more material containers 180, and to transmit the extracted fluid materials toward corresponding fluid outlets 142 through respective transmission paths. With the continuous operation of respective pump, the relevant fluid material will be outputted to the target container 190 through corresponding fluid outlet 142.

Freshly made beverages of a variety of flavors can be formed by mixing different fluid materials together in the target container 190 according to a particular ratio, or by simply stirring after mixing the fluid materials. In practice, the target container 190 may be designed to support or have a blending functionality to increase the speed and uniformity of mixing the fluid materials.

In the embodiment where the fluid material dispensing apparatus 100 is utilized to serve as a sauce dispensing apparatus, the user may place the target container 190 or other container beneath the aforementioned multiple fluid outlets 142 and manipulate the user control interface 109 to configure species and output amount of the sauce to be dispensed.

Similarly, the fluid material dispensing apparatus 100 would operate based on the parameters configured by the user to automatically utilize one or more pumps 110 to extract the fluid materials from one or more material containers 180, and to transmit the extracted fluid materials toward corresponding fluid outlets 142 through respective transmission paths. With the continuous operation of respective pump, the fluid material dispensing apparatus 100 is enabled to output one or more sauces of specific amounts to the target container 190 or other container through corresponding fluid outlet 142.

Please note that the quantity and the spatial arrangements of the pumps 110, the damper devices 120, the flowmeters 130, the fluid output device 140, the fluid outlets 142, the material output tubes 150, and the material containers 180 shown in FIG. 1 is merely an exemplary embodiment, rather than a restriction to the practical implementations It can be appreciated from the foregoing elaborations, the output terminals of the multiple fluid outlets 142 for outputting the fluid material are exposed outside the material outlet chamber 105 and directly contact with the external environment. In practice, it is difficult to completely isolate the multiple fluid outlets 142 from the material outlet chamber 105, therefore the internal temperature of the material outlet chamber 105 may be easily influenced by the external environment.

It is well known that many fluid materials will deteriorate or breed bacteria when kept at room temperature for a certain period of time, especially the fluid materials comprising protein components (e.g., various fluid materials comprising milk components or whey components).

Therefore, in order to prolong the preserving time of various fluid materials, the fluid material dispensing apparatus 100 may adopt the cooling mechanism to be described in the following to keep the fluid materials inside the fluid material dispensing apparatus 100 at low temperature, so as to reduce the possibility of fluid materials deteriorating or breeding bacteria.

Figure 3:
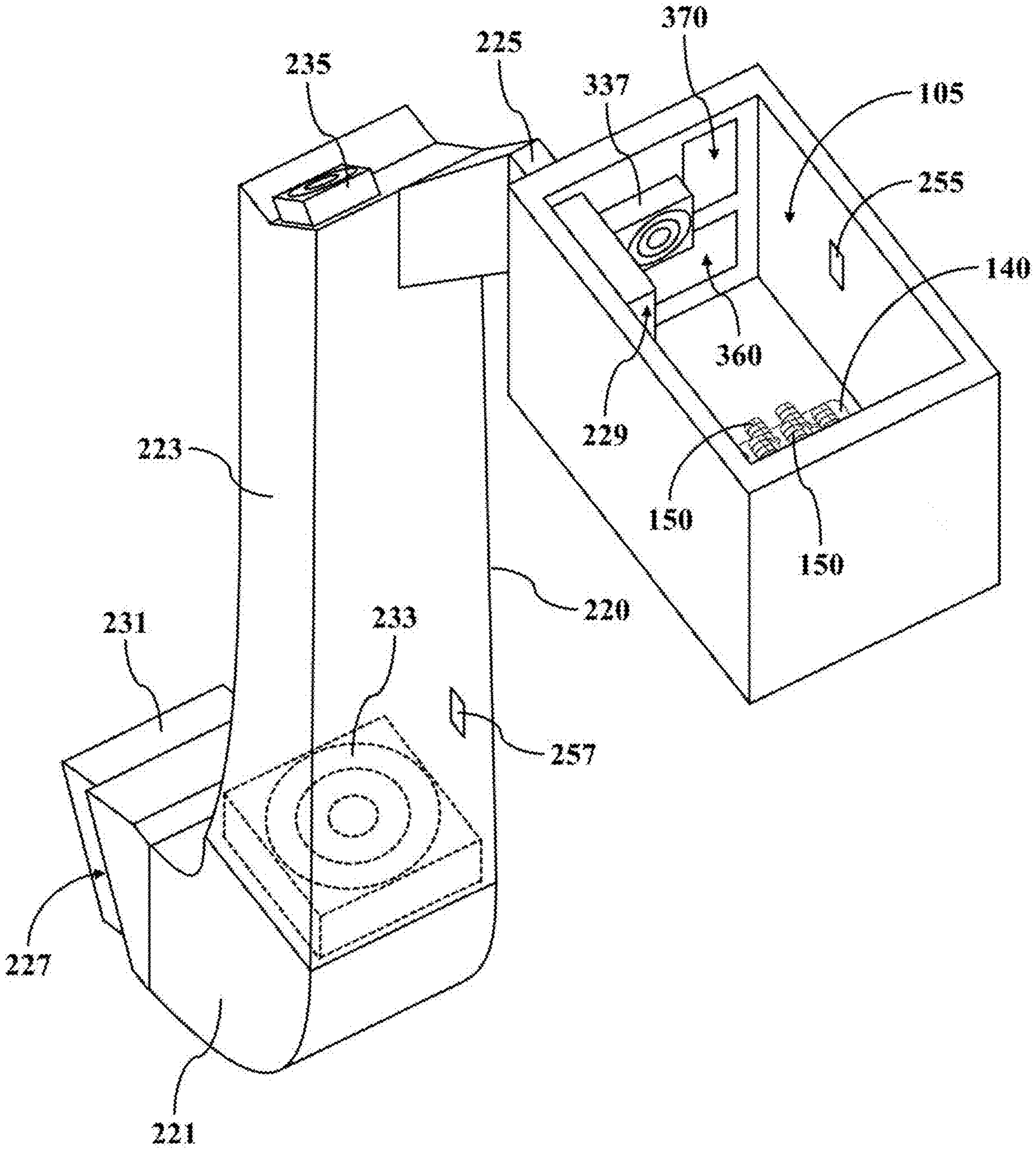
FIG. 3 shows a simplified schematic diagram of some components of FIG. 2 from a first viewing angle.
Figure 4:
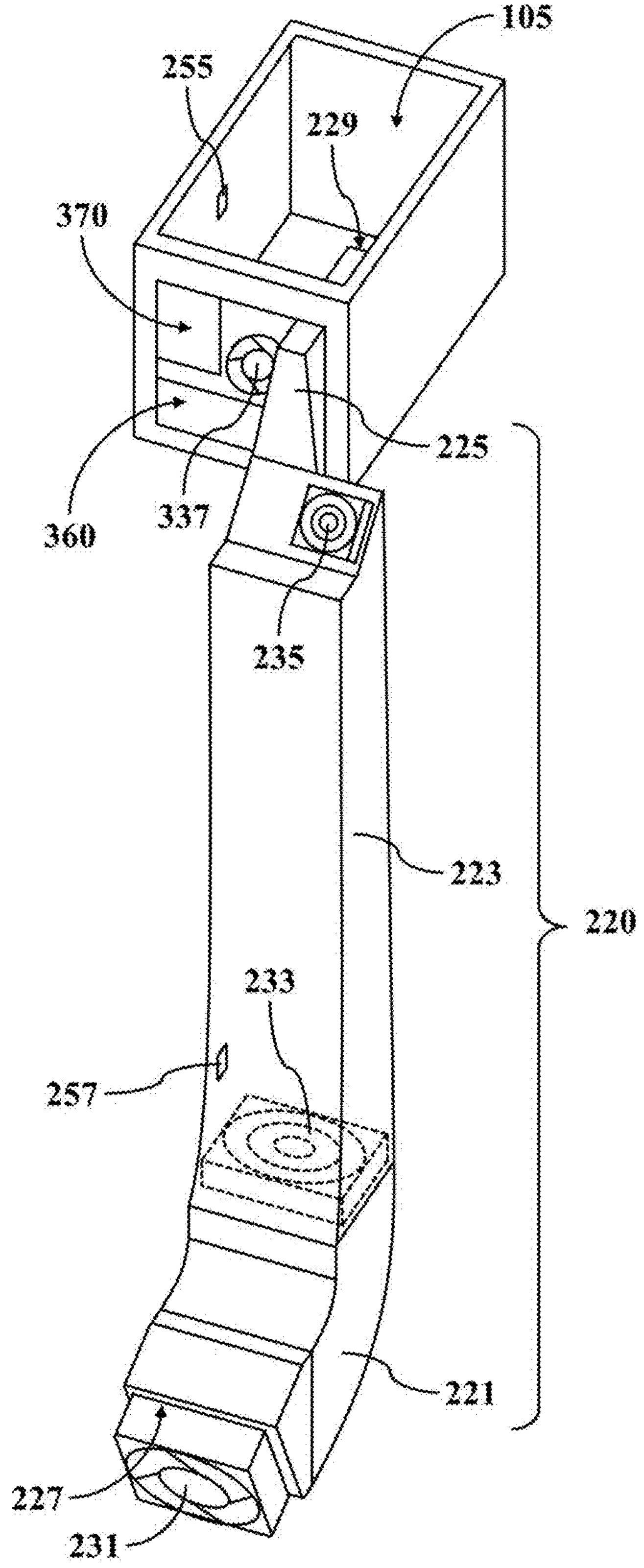
FIG. 4 shows a simplified schematic diagram of some components of FIG. 2 from a second viewing angle.

The cooling mechanism adopted by the fluid material dispensing apparatus 100 will be further described in the following by reference to FIG. 2 through FIG. 4. FIG. 2 shows a simplified schematic perspective diagram of a cooling apparatus in the fluid material dispensing apparatus 100 according to one embodiment of the present disclosure. FIG. 3 shows a simplified schematic diagram of some components in the fluid material dispensing apparatus 100 from a first viewing angle. FIG. 4 shows a simplified schematic diagram of some components in the fluid material dispensing apparatus 100 from a second viewing angle.

As shown in FIG. 2 through FIG. 4, the fluid material dispensing apparatus 100 further comprises a cold air source device 210, a cold air tunnel 220, multiple air extraction devices, and multiple temperature sensors. For the convenience of description, only three air extraction devices 231, 233, and 235, and four temperature sensors 251, 253, 255, and 257 are shown in FIG. 2 as an exemplary embodiment.

In order to reduce the complexity of the drawing contents, only some components relevant to the material outlet chamber 105, the cold air tunnel 220, and the air extraction devices 231~235 are shown in FIG. 3 and FIG. 4. Moreover, the fluid output device 140 and the material output tube 150 are not shown in FIG. 4.

In this embodiment, the cold air source device 210 is located in the lower chamber 103, and comprises a refrigeration compressor 212 and an evaporation chamber 214. One or more cold air outlets 216 are arranged on a side of the evaporation chamber 214, and various appropriate evaporators (not shown in FIG. 2 for reducing the complexity of the drawing contents) may be further arranged inside the evaporation chamber 214.

The refrigeration compressor 212 may operate with the evaporators in the evaporation chamber 214 to generate cold air with a sufficiently low temperature inside the evaporation chamber 214 and to introduce a part of the cold air into the lower chamber 103 through the cold air outlet 216, so that the internal temperature of the lower chamber 103 can be maintained at the desired low temperature state (e.g., between 1 degree Celsius and 4 degrees Celsius). In this way, it can ensure that the material containers 180 in the lower chamber 103 can be kept at an ideal low temperature state, thereby extending the storage period of the fluid materials in the material containers 180.

In practice, each of the refrigeration compressor 212 and the evaporation chamber 214 may be realized with various appropriate existing devices.

As shown in FIG. 2, the cold air tunnel 220 is coupled between the cold air source device 210 and the material outlet chamber 105, and the cold air tunnel 220 is arranged to operably introduce the cold air generated by the cold air source device 210 into the material outlet chamber 105, so as to maintain the internal temperature of the material outlet chamber 105 below a predetermined temperature.

As shown in FIG. 2 through FIG. 4, one terminal of the cold air tunnel 220 is coupled with one of the cold air outlets of the evaporation chamber 214, and another terminal of the cold air tunnel 220 is coupled with the material outlet chamber 105. In this embodiment, the cold air tunnel 220 comprises an air intake duct 221, an intermediate duct 223, and an air output duct 225.

The air intake duct 221 is coupled with the cold air source device 210 (e.g., the aforementioned evaporation chamber 214) and has an air inlet 227, and arranged to operably receive cold air generated by the cold air source device 210. The intermediate duct 223 is coupled between the air intake duct 221 and the air output duct 225. The intermediate duct 223 is arranged to operably direct the cold air transmitted from the air intake duct 221 to the air output duct 225. The air output duct 225 is coupled between the intermediate duct 223 and the material outlet chamber 105, and the air output duct 225 has an air outlet 229. The air output duct 225 is arranged to operably introduce cold air into the material outlet chamber 105.

In practice, the lengths and shapes of the air intake duct 221, the intermediate duct 223, and the air output duct 225 may be modified depending on the practical requirement. For example, in the embodiment of FIG. 2 through FIG. 4, the air intake duct 221 has an upwardly curved shape, the intermediate duct 223 has a substantially vertical shape, the air output duct 225 extends outward from an end terminal of the intermediate duct 223, and the cross-sectional area of the air output duct 225 is smaller than the cross-sectional area of the intermediate duct 223.

In this embodiment, the air output duct 225 of the cold air tunnel 220 is inserted into the material outlet chamber 105, so that a distance between the air outlet 229 and the fluid output device 140 is less than 20 centimeters (e.g., 18 centimeters, 15 centimeters, 12 centimeters, 10 centimeters, 5 centimeters, or the like). Such design ensures that the cold air outputted from the air outlet 229 can maintain a sufficiently low temperature when the cold air reaches near the fluid output device 140, so that the area near the fluid output device 140 can remain in the ideal low temperature state.

In this embodiment, the air extraction devices 231, 233, and 235 are respectively positioned on different positions on an airflow transmission path of the cold air tunnel 220, and utilized for enhancing the transmission efficiency of the cold air in the cold air tunnel 220 and for regulating the temperature of different areas inside the fluid material dispensing apparatus 100.

For example, as shown in FIG. 2 through FIG. 4, the air extraction device 231 may be positioned on the air inlet 227 of the cold air tunnel 220, and arranged to operably extract a part of cold air generated by the cold air source device 210 into the air intake duct 221. The air extraction device 233 may be positioned between the air intake duct 221 and the intermediate duct 223, and arranged to operably push cold air within the air intake duct 221 into the intermediate duct 223, so that the cold air enters the material outlet chamber 105 through the air output duct 225.

The air extraction device 235 may be positioned near a junction between the intermediate duct 223 and the air output duct 225, and arranged to operably extract a part of cold air within the cold air tunnel 220 into the upper chamber 101, thereby lowering the internal temperature of the upper chamber 101.

As shown in FIG. 2, the temperature sensor 251 is positioned in the upper chamber 101 and arranged to operably sense the internal temperature of the upper chamber 101. The temperature sensor 253 is positioned in the lower chamber 103 and arranged to operably sense the internal temperature of the lower chamber 103. The temperature sensor 255 is positioned in the material outlet chamber 105 and arranged to operably sense the internal temperature of the material outlet chamber 105. The temperature sensor 257 is positioned in the cold air tunnel 220 and arranged to operably sense the internal temperature of the cold air tunnel 220.

As shown in FIG. 3 and FIG. 4, the side wall of the material outlet chamber 105 is provided with a pipe insertion port 360 and a reflow port 370. Multiple material transmission pipes coupled between the multiple pumps 110 and the fluid output device 140 (e.g., the material transmission pipes coupled between the multiple pumps 110 and the multiple material output tubes 150) pass through the pipe insertion port 360 and enter the material outlet chamber 105. Cold air in the material outlet chamber 105 can flow into the main body of the fluid material dispensing apparatus 100 (e.g., flow into the upper chamber 101) through the reflow port 370.

In this embodiment, a center position of the reflow port 370 is purposefully arranged to be higher than a center position of the pipe insertion port 360. Such design ensures that the cold air with lower temperature can adequately fill most space in the material outlet chamber 105, thereby maintaining the internal temperature of the material outlet chamber 105 within an ideal range, such as between 1 degree Celsius and 4 degrees Celsius.

As shown in FIG. 3 and FIG. 4, the side wall of the material outlet chamber 105 may further be provided with an air extraction device 337. The air extraction device 337 is arranged to operably extract a part of cold air in the material outlet chamber 105 into the upper chamber 101, so as to accelerate an internal airflow circulation of the cold air outputted from the air outlet 229 in the material outlet chamber 105.

In order to reduce the complexity of the drawing contents, other structures and devices within the fluid material dispensing apparatus 100 are not shown in FIG. 1 through FIG. 4, such as the internal control circuit, electrical wires, signal lines, power supply apparatus, some material transmission pipes, some detergent transmission pipes, and relevant components and frames for supporting or securing the above components.

In operations, the fluid material dispensing apparatus 100 may dynamically adjust the operation of the aforementioned air extraction devices 231, 233, 235, and 337 according to the sensing results of the aforementioned temperature sensors 251, 253, 255, and 257.

For example, if the temperature sensor 255 detects that the internal temperature of the material outlet chamber 105 is higher than a first predetermined threshold value (e.g., 4 degrees Celsius, 4.5 degrees Celsius, or 5 degrees Celsius), the fluid material dispensing apparatus 100 may control the air extraction devices 231 and 233 to operate, so as to introduce more cold air into the material outlet chamber 105 through the cold air tunnel 220, thereby lowering the internal temperature of the material outlet chamber 105.

For another example, if the temperature sensor 251 detects that the internal temperature of the upper chamber 101 is higher than the first predetermined threshold value, the fluid material dispensing apparatus 100 may control the air extraction devices 231, 233, and 235 to operate, or control the air extraction devices 231, 233, and 337 to operate, so as to introduce more cold air into the upper chamber 101 through the cold air tunnel 220, thereby lowering the internal temperature of the upper chamber 101.

For another example, if the temperature sensor 251 detects that the internal temperature of the upper chamber 101 is lower than a second predetermined threshold value (e.g., 0.5 degree Celsius, 1 degree Celsius, or 1.5 degrees Celsius), the fluid material dispensing apparatus 100 may control the air extraction devices 231, 233, and 235 to suspend operation, or control the air extraction devices 231, 233, and 337 to suspend operation, so as to introduce less cold air into the upper chamber 101, thereby preventing the fluid materials from frosting or freezing due to excessively low internal temperature of the upper chamber 101.

For another example, if the temperature sensor 255 detects that the internal temperature of the material outlet chamber 105 is lower than the second predetermined threshold value, the fluid material dispensing apparatus 100 may control the air extraction devices 231 and 233 to suspend operation, so as to introduce less cold air into the material outlet chamber 105, thereby preventing the fluid materials from frosting or freezing due to excessively low internal temperature of the material outlet chamber 105.

For another example, if the temperature sensor 253 detects that the internal temperature of the lower chamber 103 is higher than a third predetermined threshold value (e.g., 5 degrees Celsius, 6 degrees Celsius, or 10 degrees Celsius, or the like), or if the temperature sensor 257 detects that the internal temperature of the cold air tunnel 220 is higher than the third predetermined threshold value, the fluid material dispensing apparatus 100 may control the air extraction devices 231, 233, and 235 to suspend operation, so as to prevent the cold air tunnel 220 from introducing air with excessively high temperature into the material outlet chamber 105 or into the upper chamber 101. This situation usually occurs when the user opens the door of the lower chamber 103 or when the cold air source device 210 is undertaking the defrost process.

As can be appreciated from the foregoing descriptions, the output terminals of the multiple fluid outlets 142 for outputting the fluid material are exposed outside the material outlet chamber 105 and directly contact with the external environment, therefore the internal temperature of the material outlet chamber 105 may be easily influenced by the external environment.

However, by adopting the cooperation of the aforementioned cold air tunnel 220, multiple air extraction devices (e.g., the aforementioned air extraction devices 231~235, 337), and multiple temperature sensors (e.g., the aforementioned temperature sensors 251~257), the cold air generated by the cold air source device 210 can be introduced into the material outlet chamber 105 and into the upper chamber 101, thereby effectively maintaining the inner space of the material outlet chamber 105 and of the upper chamber 101 at an ideal low temperature state.

As a result, various fluid materials within the material transmission paths (e.g., the aforementioned material output tube 150, or other relevant transmission pipes or various connectors, or the lie) in the material outlet chamber 105 and in the upper chamber 101 can be kept at an ideal low temperature state, thereby effectively reducing the possibility of various fluid materials in the material outlet chamber 105 and in the upper chamber 101 deteriorating or breeding bacteria.

In other words, by adopting the cooperation of the aforementioned cold air tunnel 220, multiple air extraction devices, and multiple temperature sensors, it can effectively extend the storage period of various fluid materials in the material outlet chamber 105 and in the upper chamber 101.

Therefore, even if the fluid material dispensing apparatus 100 is utilized to provide the fluid materials comprising protein components (e.g., various fluid materials comprising milk components or whey components), the cooperation of the aforementioned cold air tunnel 220, multiple air extraction devices, and multiple temperature sensors can also effectively reduce the possibility of fluid materials comprising protein components deteriorating or breeding bacteria, thereby extending the storage period of fluid materials comprising protein components.

As a result, the frequency that the fluid material dispensing apparatus 100 needs to be cleaned and be disinfected can be significantly reduced, thereby effectively reducing the labor time and relevant maintenance costs required for using the fluid material dispensing apparatus 100.

From another perspective, the disclosed fluid material dispensing apparatus 100 can effectively reduce the possibility of deterioration of fluid materials or bacterial growth without needing to install any heating devices, therefore it can also enhance the operational safety of the fluid material dispensing apparatus 100.

Please note that the quantity, shape, or position of some components in the aforementioned fluid material dispensing apparatus 100 may be modified depending on the requirement of practical applications, rather than being restricted to the pattern shown in the aforementioned embodiments.

For example, the quantity and the spatial arrangements of the pumps 110, the damper devices 120, the flowmeters 130, the fluid output device 140, the fluid outlets 142, the material output tube 150, the material containers 180, the air extraction devices, and the temperature sensors arranged in the fluid material dispensing apparatus 100 may be increased or reduced as needed.

For another example, in some embodiments, the fluid material dispensing apparatus 100 may calculate a material output volume of the fluid outlet based on an operation time of a specific pump, or based on a time length in which a corresponding fluid outlet outputs fluid materials. In this situation, a part of or all of the aforementioned multiple flowmeters 130 may be omitted.

For another example, in some embodiments, the aforementioned multiple damper devices 120 may be omitted.

For another example, in some embodiments, the cold air source device 210 may be arranged outside the fluid material dispensing apparatus 100. In other words, the cold air source device 210 may be realized with an external device.

For another example, in some embodiments, the aforementioned air extraction device 235 or air extraction device 337 may be omitted.

For another example, in some embodiments, the aforementioned temperature sensor 257 may be omitted.

For another example, in some embodiments, the air output duct 225 will be separated from the material outlet chamber 105 by a short distance and not connected to the material outlet chamber 105. In other words, the cold air tunnel 220 does not necessarily have to be connected to the material outlet chamber 105. In this situation, the air outlet 229 of the air output duct 225 may be aligned with an opening on a side wall of the material outlet chamber 105, or may be aligned with one of unblocked sides of the material outlet chamber 105. In this way, the air output duct 225 can still transmit cold air towards the material outlet chamber 105 through the air outlet 229, so that the cold air enters into the material outlet chamber 105.

For another example, in some embodiments, an air extraction device may be further arranged on the air outlet 229 of the air output duct 225, and utilized for transmitting cold air within the air output duct 225 towards the material outlet chamber 105, so as to accelerate the speed of cold air entering the material outlet chamber 105.

For another example, in some embodiments, a concave area capable of accommodating the target container 190 may be arranged at a lower portion of the main body of the fluid material dispensing apparatus 100, and the fluid output device 140 and relevant multiple fluid outlets 142 may be repositioned above the aforementioned concave area. In this situation, the material outlet chamber 105 may be arranged within the main body of the fluid material dispensing apparatus 100, and the aforementioned neck portion may be omitted.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Throughout the description and claims, the term "element" contains the concept of component, layer, or region.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

For the purpose of explanatory convenience in the specification, spatially relative terms, such as "on," "above," "below," "beneath," "higher," "lower," "upward," "downward," "forward," "backward," and the like, may be used herein to describe the function of a particular element or to describe the relationship of one element to another element (s) as illustrated in the drawings. It will be understood that the spatially relative terms are intended to encompass different orientations of the element in use, in operations, or in assembly in addition to the orientation depicted in the drawings. For example, if the element in the drawings is turned over, elements described as "on" or "above" other elements would then be oriented "under" or "beneath" the other elements. Thus, the exemplary term "beneath" can encompass both an orientation of above and beneath. For another example, if the element in the drawings is reversed, the action described as "forward" may become "backward," and the action described as "backward" may become "forward." Thus, the exemplary description "forward" can encompass both an orientation of forward and backward.

Throughout the description and claims, it will be understood that when a component is referred to as being "positioned on," "positioned above," "connected to," "engaged with," or "coupled with" another component, it can be directly on, directly connected to, or directly engaged with the other component, or intervening component may be present. In contrast, when a component is referred to as being "directly on," "directly connected to," or "directly engaged with" another component, there are no intervening components present.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A fluid material dispensing apparatus (100), comprising:

- a material outlet chamber (105);
- an upper chamber (101), arranged to operably connect to the material outlet chamber (105);
- a target air extraction device (337), positioned on a side wall of the material outlet chamber (105), arranged to operably extract a part of cold air in the material outlet chamber (105) into the upper chamber (101);
- multiple pumps (110), arranged to respectively extract multiple fluid materials stored in multiple material containers (180), and to operably push corresponding fluid materials forward; and
- a fluid output device (140), positioned on a bottom portion of the material outlet chamber (105), and comprising multiple fluid outlets (142), wherein the multiple fluid outlets (142) are respectively coupled with the multiple pumps (110) through multiple material transmission paths, and are respectively arranged to dispense corresponding fluid materials to a target container (190).

2. The fluid material dispensing apparatus (100) of claim 1, further comprising:

a cold air tunnel (220), arranged to operably introduce cold air into the material outlet chamber (105), so as to maintain an internal temperature of the material outlet chamber (105) below a predetermined temperature.

3. The fluid material dispensing apparatus (100) of claim 2, further comprising:

multiple air extraction devices (231; 233; 235), positioned on an airflow transmission path of the cold air tunnel (220), arranged to operably push cold air in the cold air tunnel (220) forward.

4. The fluid material dispensing apparatus (100) of claim 2, wherein the cold air tunnel (220) comprises:

an air intake duct (221), coupled with a cold air source device (210) and having an air inlet (227), arranged to operably receive cold air generated by the cold air source device (210);

an intermediate duct (223), coupled with the air intake duct (221); and an air output duct (225), coupled with the intermediate duct (223) and having an air outlet (229), arranged to operably output cold air into the material outlet chamber (105).

5. The fluid material dispensing apparatus (100) of claim 4, wherein a center position of the reflow port (370) is higher than a center position of the pipe insertion port (360).

6. The fluid material dispensing apparatus (100) of claim 1, wherein the air output duct (225) is inserted into the material outlet chamber (105), so that a distance between the air outlet (229) and the fluid output device (140) is less than a predetermined distance.

7. The fluid material dispensing apparatus (100) of claim 1, further comprising:

a temperature sensor (255), positioned in the material outlet chamber (105), arranged to operably sense the internal temperature of the material outlet chamber (105).

8. The fluid material dispensing apparatus (100) of claim 1, wherein a side wall of the material outlet chamber (105) is provided with a pipe insertion port (360) and a reflow port (370);

wherein multiple material transmission pipes coupled between the multiple pumps (110) and the fluid output device (140) pass through the pipe insertion port (360) and enter the material outlet chamber (105);

wherein cold air in the material outlet chamber (105) flows into a main body of the fluid material dispensing apparatus (100) through the reflow port (370).

9. A fluid material dispensing apparatus (100), comprising:

a material outlet chamber (105), wherein a side wall of the material outlet chamber (105) is provided with a target air extraction device (337), a pipe insertion port (360), and a reflow port (370);

an upper chamber (101), arranged to operably connect to the material outlet chamber (105);

multiple pumps (110), arranged to respectively extract multiple fluid materials stored in multiple material containers (180), and to operably push corresponding fluid materials forward;

a fluid output device (140), positioned on a bottom portion of the material outlet chamber (105), and comprising multiple fluid outlets (142), wherein the multiple fluid outlets (142) are respectively coupled with the multiple pumps (110) through multiple material transmission paths, and are respectively arranged to dispense corresponding fluid materials to a target container (190);

a temperature sensor (255), positioned in the material outlet chamber (105), arranged to operably sense an internal temperature of the material outlet chamber (105);

a cold air tunnel (220), arranged to operably introduce cold air into the material outlet chamber (105), so as to maintain the internal temperature of the material outlet chamber (105) below a predetermined temperature; and multiple air extraction devices (231; 233; 235), positioned on an airflow transmission path of the cold air tunnel (220), arranged to operably push cold air in the cold air tunnel (220) forward;

wherein multiple material transmission pipes coupled between the multiple pumps (110) and the fluid output device (140) pass through the pipe insertion port (360) and enter the material outlet chamber (105);

wherein cold air in the material outlet chamber (105) flows into a main body of the fluid material dispensing apparatus (100) through the reflow port (370);

wherein the target air extraction device (337) is arranged to operably extract a part of cold air in the material outlet chamber (105) into the upper chamber (101).

10. The fluid material dispensing apparatus (100) of claim 9, wherein the cold air tunnel (220) comprises:

an air intake duct (221), coupled with a cold air source device (210) and having an air inlet (227), arranged to operably receive cold air generated by the cold air source device (210);

an intermediate duct (223), coupled with the air intake duct (221); and an air output duct (225), coupled with the intermediate duct (223) and having an air outlet (229), arranged to operably output cold air into the material outlet chamber (105).

11. The fluid material dispensing apparatus (100) of claim 10, wherein the air output duct (225) is inserted into the material outlet chamber (105), so that a distance between the air outlet (229) and the fluid output device (140) is less than 20 centimeters.

12. The fluid material dispensing apparatus (100) of claim 10, wherein a center position of the reflow port (370) is higher than a center position of the pipe insertion port (360).

13. The fluid material dispensing apparatus (100) of claim 9, wherein the multiple air extraction devices (231; 233; 235) comprise:

a first air extraction device (231), positioned at the air inlet (227), arranged to operably extract a part of cold air generated by the cold air source device (210) into the air intake duct (221);

a second air extraction device (233), positioned between the air intake duct (221) and the intermediate duct (223), arranged to operably push cold air within the air intake duct (221) into the intermediate duct (223); and a third air extraction device (235), positioned near a junction between the intermediate duct (223) and the air output duct (225), arranged to operably extract a part of cold air within the cold air tunnel (220) into an upper chamber (101) of the fluid material dispensing apparatus (100).

14. The fluid material dispensing apparatus (100) of claim 13, wherein when an internal temperature of the material outlet chamber (105) is higher than a first predetermined threshold value, the first air extraction device (231) and the second air extraction device (233) operate to introduce more cold air into the material outlet chamber (105) through the cold air tunnel (220).

15. The fluid material dispensing apparatus (100) of claim 13, wherein when an internal temperature of the upper chamber (101) is higher than a first predetermined threshold value, the first air extraction device (231) and the second air extraction device (233) operate, and the air extraction device (235) or the target air extraction device (337) operates, so as to introduce more cold air into the upper chamber (101) through the cold air tunnel (220).

16. The fluid material dispensing apparatus (100) of claim 13, wherein when an internal temperature of the upper chamber (101) is lower than a second predetermined threshold value, the first air extraction device (231) and the second air extraction device (233) suspend operation, and the third air extraction device (235) or the target air extraction device (337) suspends operation, so as to introduce less cold air into the upper chamber (101).

17. The fluid material dispensing apparatus (100) of claim 13, wherein when an internal temperature of the material outlet chamber (105) is lower than a second predetermined threshold value, the first air extraction device (231) and the second air extraction device (233) suspend operation, so as to introduce less cold air into the material outlet chamber (105).

18. The fluid material dispensing apparatus (100) of claim 13, wherein when an internal temperature of the cold air tunnel (220) is higher than a third predetermined threshold value, the first air extraction device (231), the second air extraction device (233), and the third air extraction device (235) suspend operation.

* * * * *